US009626530B2

(12) United States Patent
Xiao

(10) Patent No.: US 9,626,530 B2
(45) Date of Patent: Apr. 18, 2017

(54) ELECTRONIC DEVICE AND METHOD FOR PROTECTING APPLICATIONS THEREOF

(71) Applicant: ZTE CORPORATION, Shenzhen, Guangdong Province (CN)

(72) Inventor: Longan Xiao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/655,733

(22) PCT Filed: Jul. 22, 2013

(86) PCT No.: PCT/CN2013/079821
§ 371 (c)(1),
(2) Date: Jun. 26, 2015

(87) PCT Pub. No.: WO2013/182159
PCT Pub. Date: Dec. 12, 2013

(65) Prior Publication Data
US 2015/0356309 A1  Dec. 10, 2015

(30) Foreign Application Priority Data

Dec. 28, 2012 (CN) .......................... 2012 1 0587394

(51) Int. Cl.
*G06F 21/30* (2013.01)
*G06F 21/62* (2013.01)
(Continued)

(52) U.S. Cl.
CPC .......... *G06F 21/629* (2013.01); *G06F 3/0416* (2013.01); *G06F 3/0481* (2013.01);
(Continued)

(58) Field of Classification Search
CPC ..................................................... H04L 9/0888
See application file for complete search history.

(56) References Cited

U.S. PATENT DOCUMENTS

2005/0091610 A1   4/2005  Frei et al.
2006/0010392 A1*  1/2006  Noel .................... G06F 3/0481
                                                              715/759

(Continued)

FOREIGN PATENT DOCUMENTS

CN        1934616 A      3/2007
CN      102207825 A     10/2011
(Continued)

*Primary Examiner* — Josnel Jeudy
(74) *Attorney, Agent, or Firm* — Ling Wu; Stephen Yang; Ling and Yang Intellectual Property

(57) ABSTRACT

Disclosed is a method for protecting application programs of an electronic apparatus. The electronic apparatus is provided with a touch screen, and stores a screen sharing program, other application programs, a prohibited list, a first touch track and a second touch track. The electronic apparatus runs the screen sharing program to share the screen, and senses a touch track of a user on the touch screen, when the first touch track is sensed, adds an application program corresponding to it into the list; when the second touch track is sensed, deletes an application program corresponding to it from the list; and when a point touch is sensed, searches for whether an application program corresponding to it is in the list, if yes, the screen sharing program stops screen sharing and then runs the application program; otherwise, the application program is run, and the screen sharing program performs normal screen sharing.

8 Claims, 3 Drawing Sheets

(51) Int. Cl.
  *G06F 3/041* (2006.01)
  *G06F 3/0488* (2013.01)
  *G06F 3/14* (2006.01)
  *G06F 21/10* (2013.01)
  *G06F 3/0481* (2013.01)

(52) U.S. Cl.
  CPC .......... *G06F 3/0488* (2013.01); *G06F 3/1454* (2013.01); *G06F 21/10* (2013.01); *G06F 21/6245* (2013.01); *G06F 2221/032* (2013.01)

(56) References Cited

U.S. PATENT DOCUMENTS

| | | |
|---|---|---|
| 2006/0031779 A1 | 2/2006 | Theurer et al. |
| 2008/0034435 A1* | 2/2008 | Grabarnik ............... G06F 21/84 726/25 |
| 2012/0040720 A1 | 2/2012 | Zhang et al. |
| 2012/0084848 A1* | 4/2012 | Kim ........................ H04L 67/34 726/7 |
| 2012/0182322 A1* | 7/2012 | Yeh ..................... G06F 3/04883 345/660 |
| 2013/0054815 A1* | 2/2013 | Chang ..................... H04L 67/08 709/227 |
| 2013/0166736 A1* | 6/2013 | Sainnsbury ............. H04L 67/18 709/224 |
| 2014/0123237 A1* | 5/2014 | Gaudet ................... H04L 63/08 726/4 |

FOREIGN PATENT DOCUMENTS

| | | |
|---|---|---|
| CN | 102395012 A | 3/2012 |
| CN | 103092510 A | 5/2013 |
| JP | 2012253716 A | 12/2012 |

* cited by examiner

ELECTRONIC DEVICE AND METHOD FOR PROTECTING APPLICATIONS THEREOF

TECHNICAL FIELD

The present document relates to a method for protecting application programs of an electronic apparatus, and in particular, to a method that a user can set relevant application programs not to be shared during a process of sharing screen among the electronic apparatuses, such as, a mobile phone, a computer and a television, etc., and pictures of the application program are not shared and run when the application program not to be shared set by the user is opened.

BACKGROUND OF THE RELATED ART

As the diversification and popularization of all kinds of intelligent terminals, especially wide use of smart phones, tablets and smart TVs, and the development of a relevant technology of high speed Wifi, it has been more and more mature to share a real-time screen with high quality among the smart phones, the tablets and the televisions. The screen sharing and interacting refers to realizing sharing and interacting the screen and media content information, etc., among the devices based on all types of terminals, for example, the devices with a screen display function, such as, the smart phones, the tablets, the smart TVs, etc., to satisfy requirements for the users to conveniently browse webpage, play and watch media and operate the terminal, etc., on different types of terminals.

In the process of sharing the screen of the mobile phone, sometimes the users need to protect some certain application or personal privacy information, for example, contents of the application programs, such as, short messages or an address book, are not intended to be shared onto other terminal screens. For example, when a video is played on the mobile phone, and after the video played on the mobile phone is shared to a TV screen, and at that moment, the user of the mobile phone receives a short message; and when the user wants to check contents of the short message, but does not want to share the contents of the short message onto the TV screen, then it will need to manually stop sharing the screen, and the operation is more complex.

SUMMARY

For this purpose, it is necessary to provide an electronic apparatus and a method for protecting an application program when a screen of the electronic apparatus is shared, which is easy for a user to perform a operation.

The embodiment of the present document provides a method for protecting application programs of an electronic apparatus, comprising:

the electronic apparatus running a screen sharing program to share a screen;

sensing a touch track on a touch screen of the electronic apparatus, when a first touch track has been sensed, adding an application program corresponding to the first touch track into a prohibited list; when a second touch track has been sensed, deleting an application program corresponding to the second touch track from the prohibited list; and when a point touch has been sensed, searching for whether an application program corresponding to the point touch is in the prohibited list; if the application program corresponding to the point touch in the prohibited list, the screen sharing program stopping screen sharing and then running the application program corresponding to the point touch; if the application program corresponding to the point touch is not in the prohibited list, running the application program corresponding to the point touch, and the screen sharing program performing normal screen sharing.

Preferably, after the step of running a screen sharing program to share a screen, the method further comprises: opening an application program list.

Preferably, the application program corresponding to the point touch is an application program of which a starting icon displayed on the touch screen is touched by the point touch.

Preferably, the application program corresponding to the first touch track or the second touch track is an application program of which a starting icon displayed on the touch screen is swept or circled by the first touch track or the second touch track.

The embodiment of the present document further provides an electronic apparatus, comprising a touch screen, a storage unit and a processing unit; wherein, the storage unit stores a prohibited list, a first touch track and a second touch track; the storage unit further stores a screen sharing program and other application programs which can be run by the processing unit; the storage further stores following application modules which can be run by the processing unit to complete corresponding functions:

a screen sensing module, configured to sense a touch of a user on the touch screen;

a gesture module, configured to: generate a corresponding touch track according to the touch, and determine whether the touch track is the first touch track, the second touch track or a point touch;

an adding and deleting module, configured to: when the touch track is the first touch track, add an application program corresponding to the touch track into the prohibited list; when the touch track is the second touch track, delete an application program corresponding to the touch track from the prohibited list;

a confirmation module, configured to: when a touch track of a user is a point touch, search for whether an application program corresponding to the point touch is in the prohibited list; and an execution module, configured to: when the confirmation module does not search out the application program corresponding to the point touch in the prohibited list, run the application program corresponding to the point touch; and when the confirmation module searches out the application program corresponding to the point touch in the prohibited list, notify the screen sharing program to stop screen sharing.

Preferably, the application program corresponding to the first touch track or the second touch track is an application program of which a starting icon displayed on the touch screen is swept or circled by the first touch track or the second touch track.

Preferably, the first touch track or the second touch track is continuous.

Preferably, the first touch track is a circle in one of clockwise direction and counterclockwise direction, and the second touch track is a circle in another one of clockwise direction and counterclockwise direction.

The protection mode to the application of the mobile phone provided by the embodiment of the present document can enable the user to realize to protect the particular application not to be shared when the screen of the mobile phone is shared through simple gesture operations, while does not influence sharing of other applications, which is very easy to operate and realize.

PREFERRED EMBODIMENTS OF THE INVENTION

The embodiment of the present document is described in detail with reference to the accompanying drawings hereinafter. It should be illustrated that, in the case of not conflicting, the embodiments in the present application and features in these embodiments can be combined with each other.

Figure 1:
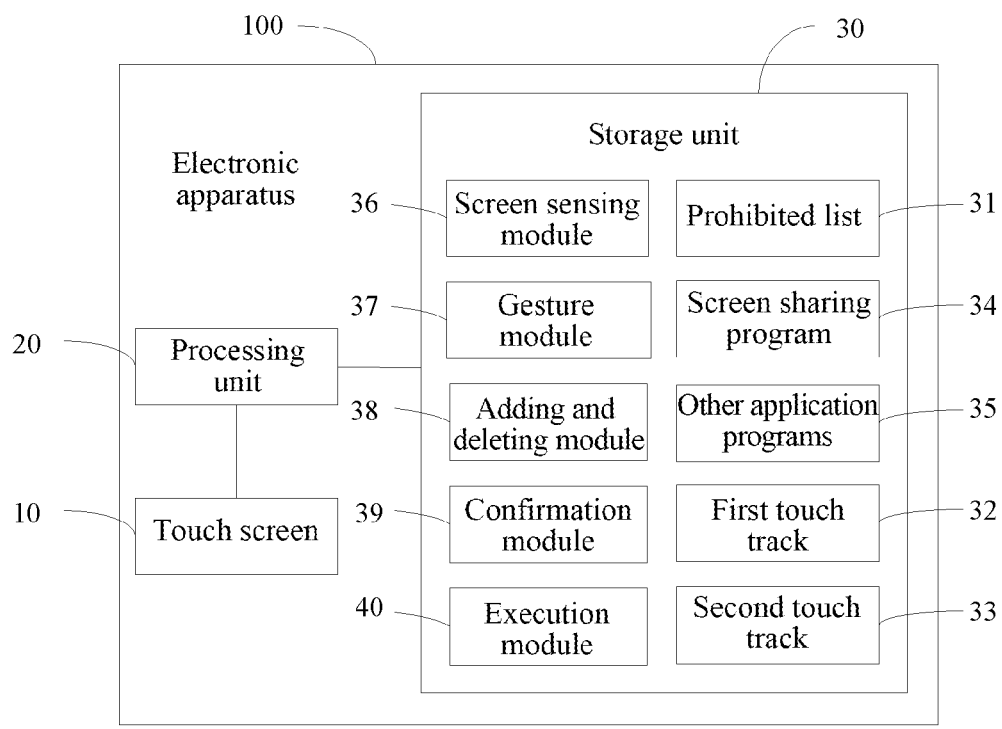
FIG. 1 is a module diagram of an electronic apparatus of a preferable embodiment of the present document.

The electronic apparatus of the embodiment of the present document can be a mobile phone, tablet, laptop or smart TV, etc. Referring to FIG. 1 an apparatus 100 comprises a touch screen 10, a processing unit 20, and a storage unit 30. The processing unit 20 may run application programs and application modules stored in the storage units 30. The application program refers that a corresponding starting icon of the application program is in an application list of the electronic apparatus 100, when a user touches the icon, a program which the processing unit perform a corresponding function. The application modules refer to modules performed by the processing module to complete the program of corresponding functions. A prohibited list 31, a first touch track 32 and a second touch track 33, a screen sharing application program 34 and other application programs 35 (application programs, such as a video player, short message, calendar and browser, etc.) are stored in the storage unit 30. A screen sensing module 36, a gesture module 37, an adding and deleting module 38, a confirmation module 39, and an execution module 40 are further stored in the storage unit 30.

A function achieved by the screen sharing program 34 is to display contents displayed on a screen of one party on a screen of another party synchronously, between two electronic apparatuses, for example, contents displayed on the tablet are synchronously displayed on the screen of a smart TV. The screen sensing module 36 is configured to sense a touch of the user on the touch screen 10. The gesture module 37 is configured to generate touch track of the user, including point touch or sliding, etc., according the touch sensed by the screen sensing module 36, and determine whether the touch track is the first touch track, the second touch track, or the point touch. The adding and deleting module 38 is configured to, when the screen sensing module 36 has sensed that the touch track of the user is the first touch track 37, add the application program corresponding the touch track at this time into the prohibited list 31; when the touch track of the user is the second touch track 33, delete the application program corresponding the touch track at this time from the prohibited list 31. The confirmation module 39 is configured to, when the screen sensing module 36 has sensed that the touch track of the user is the point touch, search for whether an application program corresponding to the point touch is in the prohibited list 31. The execution module 40 is configured to: when the confirmation module 39 does not search out the application program corresponding to the point touch in the prohibited list, run the application program corresponding to the point touch at this time; and when the confirmation module 39 search out the application program corresponding to the point touch in the prohibited list 31, notify the screen sharing program 34 to stop screen sharing.

Later referring to FIG. 2 and FIG. 3, the first touch track 32 stored in the storage unit 30 can be a circle in the counterclockwise direction, and the second touch track 33 can be a circle in the clockwise direction. After the user starts the screen sharing program 34, and when the user touches on the touch screen 10, the gesture module 37 generates the touch track of the user according to the screen sensing module 36, and determines whether the touch track is the point touch, the first touch track 32, the second touch track 33 or other tracks.

Assuming that the touch track of the user is a circle in the counterclockwise direction located on application program 1, that is, the first touch track 37, at this time, the adding and deleting modules 38 will add the application program corresponding to the touch track, that is, the application program 1, into the prohibited list 31.

Next, assuming the user performs the point touch on the application program 1, after the gesture module 37 recognizes the point touch of the user, the confirmation module 39 searches for whether the application program corresponding to the point touch in the prohibited list 31, that is, the application program 1, at this time, if the application program 1 is searched out, then the execution module 40 will notify the screen sharing program 34 to stop the screen sharing, to prevent sharing the picture when the application program 1 is run. At this point, there is need for the manual operation of the user, which greatly facilitates the user.

While assuming that the user performs the point touch on the application program 3, after the gesture module 37 recognizes the point touch of the user, the confirmation module 39 searches for whether the application program corresponding to the point touch is in the prohibited list 31, that is, the application program 3. At this time, if no the application program is searched out, then the execution module 40 will run the application program, to share the picture when the program is run.

Assuming that the touch track of the user is a circle in the clockwise direction on the application program 1, that is, the second touch track 33, at this time, the adding and deleting module 38 deletes the application program corresponding to the touch track at this time, that is, the application program 1, from the prohibited list 31. Next, when the user performs point touch on the application program 1 or other application programs again, the working process of the electronic apparatus is similar with the process after the above-mentioned counterclockwise touch track of the user and will not go into details here.

Figure 2:
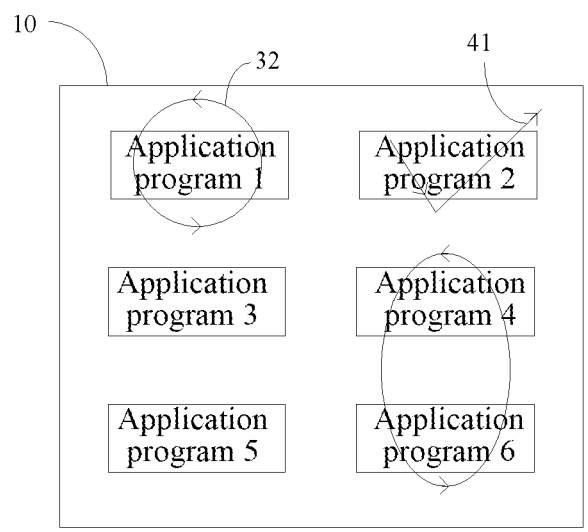
FIG. 2 shows contents displayed on a screen of the electronic apparatus in FIG. 1 and an operation track of a user on the screen.
Figure 3:
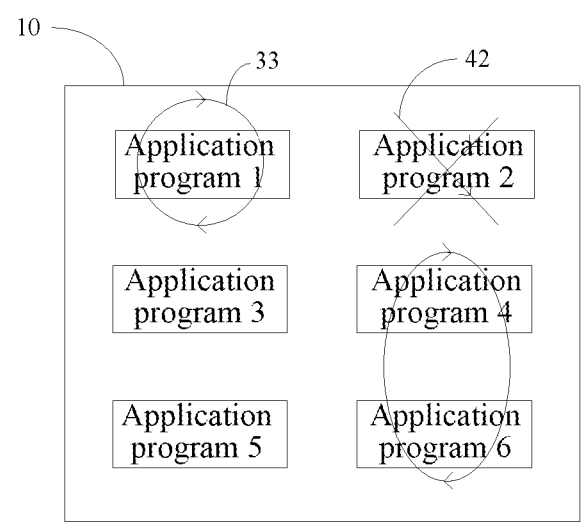
FIG. 3 shows an operation track which is adverse to the track of the user in FIG. 2.

It can be understood that the first touch track 32 and the second touch track 33 are not limited to the above implementation modes, for example, shapes of the first touch track 32 and the second touch track 33 also can be similar to squares, triangles, etc., which can be closed and also can be not completely closed; in addition, also can be respectively hooks 41 and forks 42 as shown in FIGS. 2 and 3. Similarly, it can be understood that the application programs, corresponding to the first touch track 32 and the second touch track 33, that the adding and deleting module 38 adds into the prohibited list 31 or deletes from the prohibited list 31 are not limited to one, for example, the application programs can also be two application programs 4 and 6 swept by the oval first touch track 43. In the above-mentioned several modes, the corresponding programs are all swept by the touch track, and of course it also can be understood that, in other implementation modes, the corresponding programs can also be surrounded by the touch track, for example, drawing a circle around the icon of the application program 1, while without touching the icon.

Figure 4:
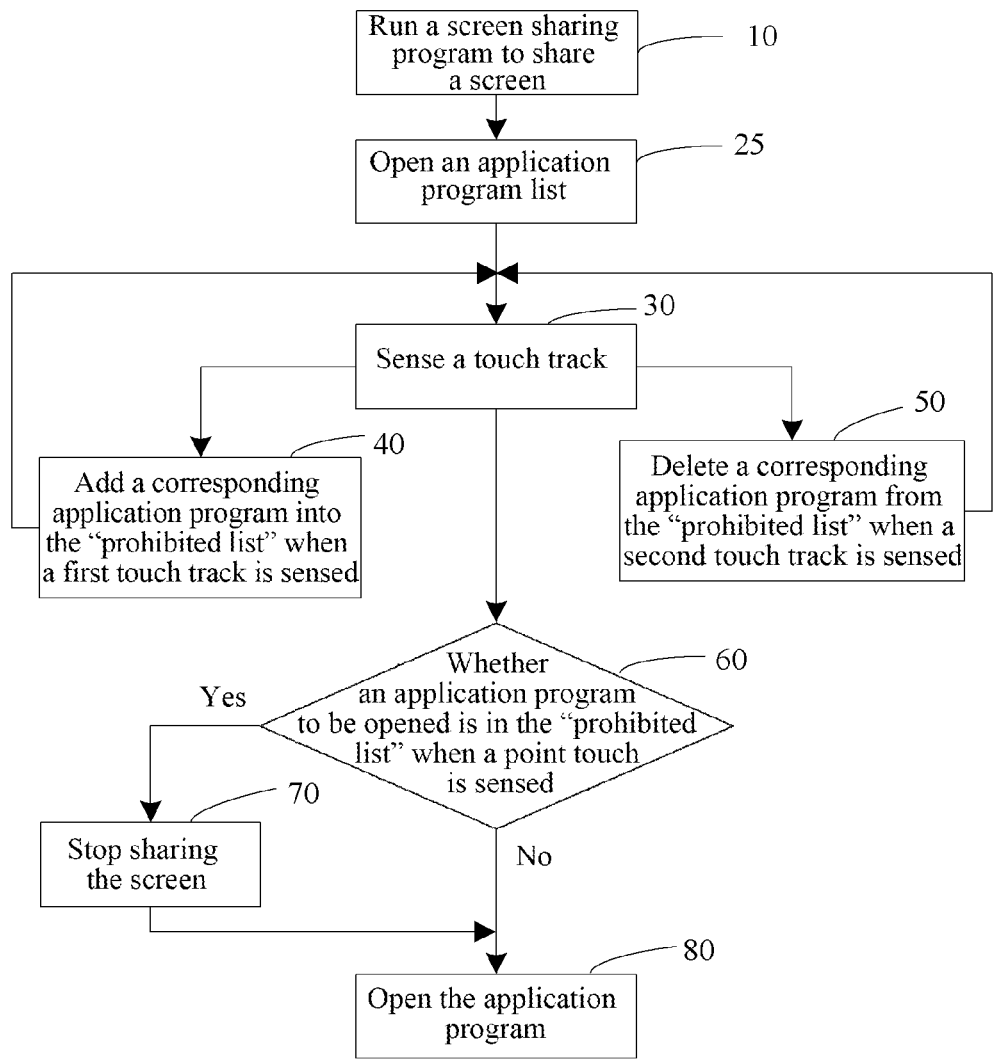
FIG. 4 is a diagram of a method for protecting an application program when the electronic apparatus shown in FIG. 1 shares the screen.

Please referring to FIG. 4, the above-mentioned method for protecting the application program when the electronic apparatus shares the screen comprises following steps.

In step 10, the screen sharing program is run, in order to share the screen.

In step 30, the touch track of the user on the touch screen is sensed, and step 40 is executed when the first touch track is sensed; step 50 is executed when the second touch track is sensed; and step 60 is executed when the point touch is sensed.

In step 40, the application program corresponding to the first touch track at this time is added into the prohibited list and it is returned to the step 30, to continue sensing the touch track.

In step 50, the application program corresponding to the second touch track at this time is deleted from the prohibited list and it is returned to the step 30 to continue sensing the touch track.

In step 60, it is to search for whether the application program corresponding to the point touch is in the prohibited list; if the application program is searched out, then step 70 is executed; if the application program is not searched out, then step 80 is executed.

In step 70, sharing the screen is stopped.

In step 80, the application program is run.

Preferably, a step 25 is further included between the steps 10 and 30, it is to open the application program list, so as to select which application programs to add into the prohibited list 31 or delete therefrom; at the same time, also to facilitate to directly start the application program to be shared from the application program list, such as, playing a video or picture, etc.

It can be understood by those skilled in the art that all or part of steps in the above-mentioned method can be fulfilled by programs instructing the relevant hardware, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only the preferable embodiments of the present document and is not intended to limit the patent scope of the present document. All conversions of equivalents structures and equivalents procedures made by using the description and accompanying drawings of the present document, or direct or indirect using in other related technical field, should be embodied in the protection scope of the appending claims of the present document.

INDUSTRIAL APPLICABILITY

The protection mode to protect the application of the mobile phone provided by the embodiment of the present document can enable the user to realize to protect the particular application not to be shared when the screen of the mobile phone is shared through simple gesture operations, while sharing of other applications is not influenced, which is very easy to operate and realize.

I claim:

1. A method for protecting application programs of an electronic apparatus comprising a touch screen, a storage device and a processor, comprising:
   providing a screen sharing program to the storage device for installation on the electronic apparatus; and
   the electronic apparatus running the screen sharing program to share a screen between two electronic apparatuses to enable the screen sharing program displays contents displayed on the touch screen of the electronic apparatus on a screen of another electronic apparatus synchronously; wherein the processor performs steps of:
   generating a touch track of a user when the user touches on the touch screen of the electronic apparatus, and sensing the touch track on the touch screen of the electronic apparatus,
   determining whether the touch track is a first touch track, a second touch track, or a point touch,
   when the touch track of the user is the first touch track, adding an application program corresponding to the first touch track into a prohibited list;
   when the touch track of the user is the second touch track, deleting an application program corresponding to the second touch track from the prohibited list; and
   when the touch track of the user is the point touch, searching an application program corresponding to the point touch in the prohibited list and determining whether the application program corresponding to the point touch is in the prohibited list; if the application program corresponding to the point touch is in the prohibited list, stopping screen sharing caused by the screen sharing program and then running the application program corresponding to the point touch; if the application program corresponding to the point touch is not in the prohibited list, running the application program corresponding to the point touch, and maintaining normal screen sharing caused by the screen sharing program.

2. The method according to claim 1, wherein after the step of running a screen sharing program to share the screen, the method further comprises: opening an application program list.

3. The method according to claim 1, wherein, the application program corresponding to the point touch is an application program of which a starting icon displayed on the touch screen is touched by the point touch.

4. The method according to claim 1, wherein, the application program corresponding to the first touch track or the second touch track is an application program of which a starting icon displayed on the touch screen is swept or circled by the first touch track or the second touch track.

5. An electronic apparatus, comprising:
   a touch screen, a storage device and a processor;
   wherein, the storage device stores a prohibited list, a first touch track and a second touch track; the storage device further stores a screen sharing program and other application programs which can be run by the processor;
   the screen sharing program is to share a screen between two electronic apparatuses to enable the screen sharing program displays contents displayed on a screen of the electronic apparatus on a screen of another electronic apparatus synchronously;

the storage device further stores following application modules which can be run by the processor to complete corresponding functions:

a screen sensing module, configured to sense a touch of a user on the touch screen;

a gesture module, configured to: generate a corresponding touch track according to the touch, and determine whether the touch track is the first touch track, the second touch track or a point touch;

an adding and deleting module, configured to: when the touch track is the first touch track, add an application program corresponding to the touch track into the prohibited list; when the touch track is the second touch track, delete an application program corresponding to the touch track from the prohibited list;

a confirmation module, configured to: when a touch track of a user is a point touch, searching an application program corresponding to the point touch in the prohibited list and determining whether the application program corresponding to the point touch is in the prohibited list; and an execution module, configured to: when the confirmation module does not search out the application program corresponding to the point touch in the prohibited list, run the application program corresponding to the point touch and maintain normal screen sharing caused by the screen sharing program; and when the confirmation module searches out the application program corresponding to the point touch in the prohibited list, stop screen sharing caused by the screen sharing program and then run the application program corresponding to the point touch.

6. The electronic apparatus according to claim 5, wherein, the application program corresponding to the first touch track or the second touch track is an application program of which a starting icon displayed on the touch screen is swept or circled by the first touch track or the second touch track.

7. The electronic apparatus according to claim 6, wherein, the first touch track or the second touch track is continuous.

8. The electronic apparatus according to claim 7, wherein, the first touch track is a circle in one of clockwise direction and counterclockwise direction, and the second touch track is a circle in another one of clockwise direction and counterclockwise direction.

* * * * *